United States Patent
Kant et al.

(10) Patent No.: US 10,021,560 B2
(45) Date of Patent: *Jul. 10, 2018

(54) METHOD AND SYSTEM FOR SELECTIVE AND SECURE INTERACTION OF BYOD (BRING YOUR OWN DEVICE) WITH ENTERPRISE NETWORK THROUGH MOBILE WIRELESS NETWORKS

(71) Applicant: MAVENIR SYSTEMS, INC., Richardson, TX (US)

(72) Inventors: Nishi Kant, Fremont, CA (US); Heeseon Lim, Cupertino, CA (US)

(73) Assignee: Mavenir Systems, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/628,507

(22) Filed: Jun. 20, 2017

(65) Prior Publication Data
US 2017/0353852 A1 Dec. 7, 2017

Related U.S. Application Data

(63) Continuation of application No. 13/899,533, filed on May 21, 2013, now Pat. No. 9,716,996.

(51) Int. Cl.
*H04M 3/16* (2006.01)
*H04W 8/18* (2009.01)
(Continued)

(52) U.S. Cl.
CPC ............. *H04W 8/18* (2013.01); *H04W 12/06* (2013.01); *H04W 8/265* (2013.01)

(58) Field of Classification Search
CPC ........ H04W 8/18; H04W 12/06; H04W 8/265
(Continued)

(56) References Cited

U.S. PATENT DOCUMENTS 8,364,141 B1  1/2013 Kateley
9,716,996 B2*  7/2017 Kant ...................... H04W 8/18
(Continued)

OTHER PUBLICATIONS

Ghadialy, Zahid, "A look at 'Idle state Signalling Reduction' (ISR)", "The 3G4G Blog", Aug. 3, 2011.
(Continued)

*Primary Examiner* — Amancio Gonzalez
(74) *Attorney, Agent, or Firm* — Ohlandt, Greeley, Ruggiero & Perle, L.L.P.

(57) ABSTRACT

A mechanism to allow provisioning and use of BYOD (Bring Your Own Device) for authorized access in the enterprise network through a 3G/4G/Wi-Fi access network is provided. A brokering entity in the mobile packet core is provisioned for each authorized employee with enterprise specific rules for security and steering of user traffic. An Enterprise Container is defined as entity on the User Equipment that is self-contained virtual machine with enterprise sanctioned applications. An intelligent mechanism for and steering of signaling and traffic from such BYOD devices to the brokering entity is defined. At any time by using the personal container or the default behavior of the user equipment the user can get mobile service as if the Enterprise Container did not exist. Further, when such employment relationship is terminated the user's BYOD needs to be restored to its pre-employment functionality.

22 Claims, 3 Drawing Sheets

(51) Int. Cl.
*H04W 12/06* (2009.01)
*H04W 8/26* (2009.01)

(58) Field of Classification Search
USPC .......................................................... 455/411
See application file for complete search history.

(56) References Cited

U.S. PATENT DOCUMENTS

| | | |
|---|---|---|
| 2002/0061746 A1 | 5/2002 | Jo et al. |
| 2004/0008657 A1 | 1/2004 | Lee et al. |
| 2004/0107146 A1 | 6/2004 | Alfano |
| 2004/0162818 A1 | 8/2004 | Shaw |
| 2007/0207770 A1 | 9/2007 | Ikaheimo |
| 2008/0200156 A1 | 8/2008 | Hicks et al. |
| 2009/0156201 A1 | 6/2009 | Pudney et al. |
| 2010/0144307 A1 | 6/2010 | Wu |
| 2010/0165862 A1 | 7/2010 | Nylander |
| 2010/0184454 A1 | 7/2010 | Luft et al. |
| 2010/0278041 A1 | 11/2010 | Shi |
| 2011/0026469 A1 | 2/2011 | Wu |
| 2011/0047427 A1 | 2/2011 | Bailey |
| 2012/0033659 A1 | 2/2012 | Zhang et al. |
| 2012/0178449 A1 | 7/2012 | Liao |
| 2012/0275401 A1 | 11/2012 | Sun |
| 2012/0282924 A1 | 11/2012 | Tagg et al. |
| 2013/0029637 A1 | 1/2013 | Hillier et al. |
| 2013/0054828 A1 | 2/2013 | Nishi |
| 2013/0083667 A1 | 4/2013 | Persson |
| 2013/0103939 A1 | 4/2013 | Radpour |
| 2013/0152042 A1 | 6/2013 | Bennett |
| 2013/0262592 A1 | 10/2013 | DeLuca |
| 2015/0003595 A1 | 1/2015 | Yaghi |
| 2015/0156093 A1 | 6/2015 | Li |

OTHER PUBLICATIONS

ETSI, "TS 123 401 V9.8.0 (Mar. 2011)", "LTE; General Packet Radio Service (GPRS) enhancements for Evolved Universal Terrestrial Radio Access Network (E-UTRAN) access (3GPP TS 23.401 version 9.8.0 Release 9)", Mar. 2011.

* cited by examiner

Structure of IMSI 3a00

Structure of P-TMSI 3b00

METHOD AND SYSTEM FOR SELECTIVE AND SECURE INTERACTION OF BYOD (BRING YOUR OWN DEVICE) WITH ENTERPRISE NETWORK THROUGH MOBILE WIRELESS NETWORKS

CROSS REFERENCE TO RELATED APPLICATIONS

This application is a continuation of U.S. application Ser. No. 13/899,533, filed May 21, 2013, entitled Method and System for Selective and Secure Interaction of BYOD (Bring Your Own Device) with Enterprise Network Through Mobile Wireless Networks, the contents of which are incorporated herein in their entirety by reference.

FIELD OF THE DISCLOSURE

The present disclosure relates generally to mobile wireless networks which include general packet radio service (GPRS) networks, universal mobile telecommunications system (UMTS) and long term evolution (LTE). Standardization work has also been done to interwork Wi-Fi radio with the above-said networks. Specifically, this disclosure relates to a method and system for allowing an Enterprise Container (or Enterprise Entity) within individually owned third generation (3G), fourth generation (4G) or Wi-Fi data devices (e.g., smart phones, tablets, personal computers (PCs), etc. which are also known as "Bring Your Own Device" (BYOD)) to securely interact with a trusted Enterprise Broker and eventually to an enterprise network itself using 3G, 4G or interwork Wi-Fi access. Enterprise policies decide which applications are allowed within the Enterprise Container on the BYOD. Based on these enterprise polices, the trusted Enterprise Broker is configured to steer the data to enterprise and external networks.

BACKGROUND

GPRS and UMTS networks are an evolution of the global system for mobile communications (GSM) standards to provide packet switched data services to GSM mobile stations. Packet-switched data services are used for transmitting chunks of data or for data transfers of an intermittent or bursty nature. Typical applications for Third Generation Partnership Project (3GPP) packet services include Internet browsing, wireless e-mail, video streaming, credit card processing, etc. utilized by human users. 3GPP packet service could also be used to connect mobile devices to packet data networks owned by organizations such as government or enterprises. FIG. 1 shows 3GPP networks (3G UMTS and 4G LTE) connecting mobile devices to the Internet as well as a private data network. It also shows interworking with Wi-Fi access. Referring to FIG. 1, mobile devices 102 and 103 are communicatively coupled to a packet core network 110. For example, 3G/4G User Equipment (UE) 102 is coupled to packet core network 110 via a 3G Radio Access Network (RAN) 104 through, for example, node B (NB) and radio network controller (RNC) 105 and from there to the packet core node through the Serving GPRS Support Node (SGSN) 111. The UE 102 is additionally coupled to the core network 110 via a corresponding LTE access network (e.g., evolved UMTS terrestrial RAN (Evolved Universal Terrestrial Radio Access Network (E-UTRAN)) node B (eNB) 106. Finally the 3G/4G/Wi-Fi UE 103 is coupled to the packet core network 110 via RNC 105 or eNB 106 or via Wi-Fi access point 123. In order to communicate to a data service located in other networks such as the Internet 120 and/or private network enterprise (or enterprise premise) 121, UE data devices 102 and 103 have to go through packet core network 110. Typically, packet core network 110 includes SGSN 111 for the 3G network or serving gateway (S-GW) 113 for the LTE network 106 and a gateway GPRS support node (GGSN) 112 for the 3G network or packet data network (PDN-GW) 114 for the LTE network. The packet core network 110 also has evolved packet date gateway (ePDG) 122 and 3GPP AAA Server 113 when Wi-Fi access 123 is interworked. SGSN 111/S-GW 113 and GGSN 112/PDN-GW 114 relay communications between UE 102 and UE 103 and a destination (e.g. Internet 120 and enterprise server 121). A typical packet core network 110 also includes a home location register (HLR) or home subscriber server (HSS) 117 storing subscription profile and a policy and charging rule function (PCRF) 118.

Today mobile technology has permeated through all walks of life and mobile phone penetration is more than 100% in most developed markets. Advances in content delivery (applications (Apps), streaming media, interactive), screen resolution (e.g., high-definition (HD)) and user interface (e.g., multi-touch, voice interactive), etc. have led to a new phenomenon called "device loyalty" where consumers make buying choices irrespective of their service providers and employers. Open mobile operation systems (OS) like Android® allow devices makers to create fairly sophisticated devices and bring them to market pretty quickly. People assemble their favorite set of applications as they see fit from the App stores and other sources. Some of these applications could have questionable origins since the Android® app store does not validate or qualify apps based on their behavior.

Employers realize that mobile connectivity with employees leads to higher productivity. However, in the digital age where most of the knowhow, business strategies and product secrets exist as data, enterprises take security of their network quite seriously. In order to be productive the mobile employee will need access to the enterprise network. While enterprises can issue another mobile device to employees, it is neither cost effective nor productive. Rather it is burdensome since the mobile employee has not only to carry personal and enterprise devices all the time, but has to deal with logistics of partitioning their contacts and activities into personal and business which is ineffective and tedious if not impossible. This has lead to BYOD policies at the enterprise where employees bring their own mobile device and get enterprise's permission to access the corporate network. The decline of the enterprise specific Blackberry® is an indicator that this trend is strong. While it is convenient thing to do, it also opens up the enterprise network to attacks through variety of apps on the BYOD device. While this problem applies to all smartphones and mobile computing platforms, the problem is more acute for the Android® ecosystem, given the open nature of the Android® app store, the number of apps and the sheer number of devices running Android®.

Traditional security solutions such as Internet Protocol security (IPSec) virtual private networks (VPNs) are impractical for mobile devices. IPsec encryption is computer intensive and has an adverse effect on battery life. Moreover, such VPN solutions typically rely on the end device being under protection of "always on" virus or malware scanning software that are connected to an enterprise monitor. It may not be practical for the user or the enterprise to continuously manage BYOD devices in the same manner. Therefore once malicious apps are on the smartphone because of intentional or unintentional user action, they could get root access by tricking the user and after that could get unauthorized access to the enterprise network even if the VPN was on. Therefore, traditional VPN solutions are not only inefficient but inadequate as well in the context of BYOD.

Some have proposed virtualization based solutions whereby the mobile device runs personal and enterprise personality in a virtualized environment. The VMware®. Mobile Virtual Platform (MVP) is such an example. The enterprise personality is a self-contained virtual machine image and serves as the "enterprise container" for enterprise authorized apps and security policies. Just like in case of desktop virtualization, the enterprise container executes as a self-contained operating system. The personal and enterprise app containers may act as virtual machines (VM) on single user equipment (UE). The enterprise container is also expected to perform security procedures towards the enterprise and interact with the enterprise over the mobile network. Unfortunately, a traditional mobile network is not well suited for connecting to a large number of enterprises. The standard mechanism to interconnect a mobile network and an enterprise network is the Access Point Name (APN). The APN is part of the subscription profile. For APN-based enterprise access, the user first subscribes to that APN (i.e., the APN is put in subscriber profile at the HLR/HSS). In subsequent access requests, the UE includes the APN as part of the request. Upon receiving such a request, the SGSN/Mobility Management Entity (MME) first checks the subscription profile (downloaded from HLR/HSS) to confirm that the user is authorized to access the APN and upon success it passes this information to the Gateway GPRS Support Node (GGSN)/packet data gateway (P-GW). The P-GW typically has external networking setup to the enterprise for such an APN. It is obvious from this description that adding an APN subscription has many touch points in the mobile network and it is impractical or unsustainably expensive to do so as people join and leave hundreds or thousands of enterprises. Nodes like HLR/HSS, SGSN/MME, GGSN/P-GW and the like were not designed to be opened to each enterprise so that they can manage enterprise connectivity of their mobile employees. Clearly, there is a need for an enterprise managed element within the mobile network and for a method to steer signaling and traffic in a way that such an enterprise managed element can have control over enterprise access.

SUMMARY

The embodiments disclosed herein provide a solution so that an enterprise can provision BYOD devices of its employees in the mobile packet core and define rules for security, application distribution and steering of signaling and traffic from such BYOD devices. Further, when such employment relationship is terminated the user's BYOD is able to be restored to its pre-employment functionality.

An aspect of the embodiments disclosed herein is the trusted Enterprise Broker (EB) which is a function that may reside in the mobile packet core. The EB provides application programming interfaces (APIs) for provisioning of per enterprise policies and for provisioning of supplemental data for each subscriber for that enterprise. It augments private networking capabilities of the mobile packet core with enterprise specific security policies (both static and dynamic) with the possibility of using mobile authentication as a supplement to the enterprise authentication. The EB may include structured information storage. The EB is an intermediary between the mobile device and the traditional HLR/HSS. The EB alters signaling parameters in such a way that traditional nodes HLR/HSS, SGSN/MME, and P-GW/GGSN typically do not need to be changed in order to fulfill interaction and management with the UE. Based on enterprise policies, the EB performs the traffic steering for an associated application to the enterprise network or to external networks.

Another aspect of the embodiments disclosed herein are methods in a non-roaming scenario that force the flow of signaling for the packet data session to an enterprise capable preferred node (the EB) in the mobile packet core according to the 3GPP rules of the multi-operator core network (MOCN) and Iu-flex/S1-flex based pooling. These methods include the ability to determine if the preferred node is reachable in a non-roaming scenario. This is achieved by setting the Network Resource Indication (NRI) bits of a Packet Temporary Mobile Subscriber Identity (P-TMSI) to a value corresponding to the preferred enterprise node (the EB) in the mobile packet core.

The third aspect of embodiments disclosed herein are methods in a roaming scenario that force the flow of packet domain signaling to an enterprise capable preferred node (the EB) in the mobile packet core according to the 3GPP rules of Routing Area Update (RAU). This may be achieved by setting the higher bits of MSIN part of the IMSI that are typically used to indicate preferred HLR/HSS in the mobile network to a value corresponding to the preferred enterprise node. These methods include the ability to instruct the traditional SGSN or MME to select the preferred enterprise node as the packet data gateway so that enterprise specific external networking and policies are uniformly available in this scenario.

The fourth aspect of embodiments of this disclosure are methods in a non-3GPP based access scenario (e.g., Wi-Fi) to force the flow of signaling and traffic to an enterprise capable preferred node (the EB) in the mobile packet core according to the 3GPP rules of Interworking Wireless Local Access Network (IWLAN) interworking. This ensures that enterprise specific external networking and policies are uniformly available in this scenario.

The embodiments disclosed above include a standard data capable enterprise UE as well as virtualized enterprise containers within the UE.

The fifth aspect of the embodiments disclosed herein is the interaction of the enterprise UE or enterprise container with the EB in the mobile packet core so that a chain of trust can be established from the user personal identification number (PIN) to user subscriber identity module (SIM) and enterprise credentials. An Enterprise Container (or Enterprise Application Container) (EC) is a virtualized instance of an enterprise qualified mobile device which serves as an "isolated" container for enterprise authorized applications and operates as per enterprise policies that are made available on a per enterprise basis by the EB.

BRIEF DESCRIPTION OF THE DRAWINGS

The present embodiments are illustrated by way of example and not limitation in the figures of the accompanying drawings in which like references indicate similar elements.

DETAILED DESCRIPTION

In the following description, numerous details are set forth to provide a more thorough explanation of the embodiments of this disclosure. It will be apparent, however, to one skilled in the art, that the embodiments may be practiced without these specific details. In other instances, well-known structures and devices are shown in block diagram form, rather than in detail, in order to avoid obscuring embodiments of the disclosure.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment.

According to the embodiment shown in FIG. 3, a system EB 300 in a mobile packet core network interacts with enterprise UE 301 or EC 302 located within the UE 301. While the embodiment is described with a focus on EC 302, it is equally applicable to UE 301 which may be enterprise issued. EB 300 includes an access network interface unit, a processor and memory (database (DB) 310). EB 300 receives provisioning data and policies from Enterprise Private Network 315 that it stores in structured form in database 310 regarding enterprise's employees subscription and devices. The provisioning data and policies may be continuously updated by the Enterprise Private Network 315 so that the security policies of the network 315 are both static and dynamic. The user plane 312 of EB 300 uses this provisioned information to steer the data from UE 301 to the Internet 314 or Enterprise Private Network 315.

One aspect of this disclosure is the steering of signaling from EC 302 to EB 300 through RAN 303 which is coupled to EB 300. According this embodiment, EB 300 is associated with an identification code that allows RAN 303 to select EB 300 among other nodes as the place to seek services as per the 3GPP rules of MOCN and Iu-flex/S1-flex features. U.S. patent application Ser. No. 12/987,546, filed on Jan. 10, 2011, and which is hereby incorporated by reference in its entirety, describes a standard 3GPP mechanism as well an enhancement and for the purposes of this disclosure both may be used.

Figure 1:
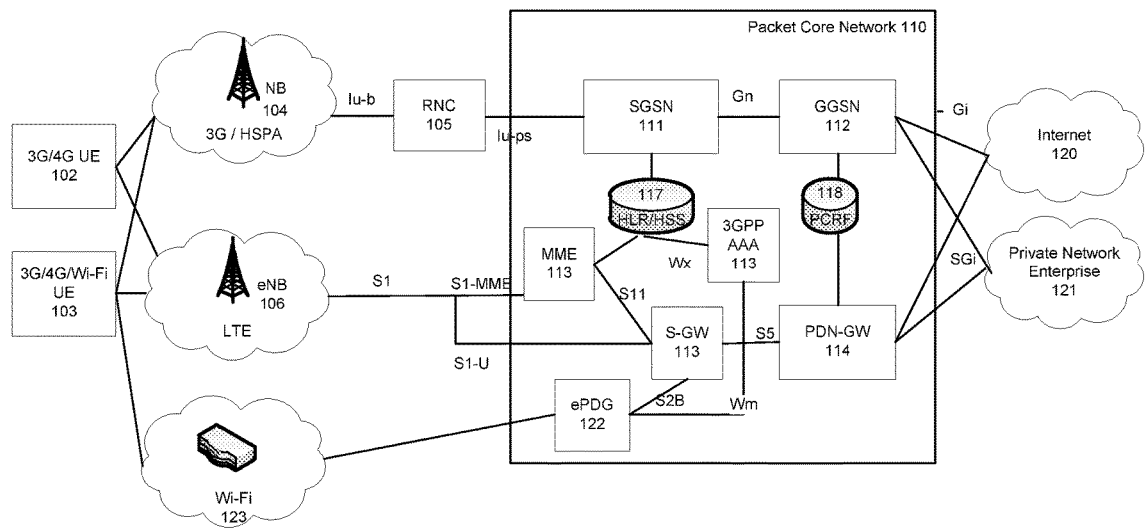
FIG. 1 is a block diagram illustrating mobile communications over a typical 3GPP packet core network and the interconnection with RANs and external networks (e.g., Internet or enterprise network).
Figure 2:
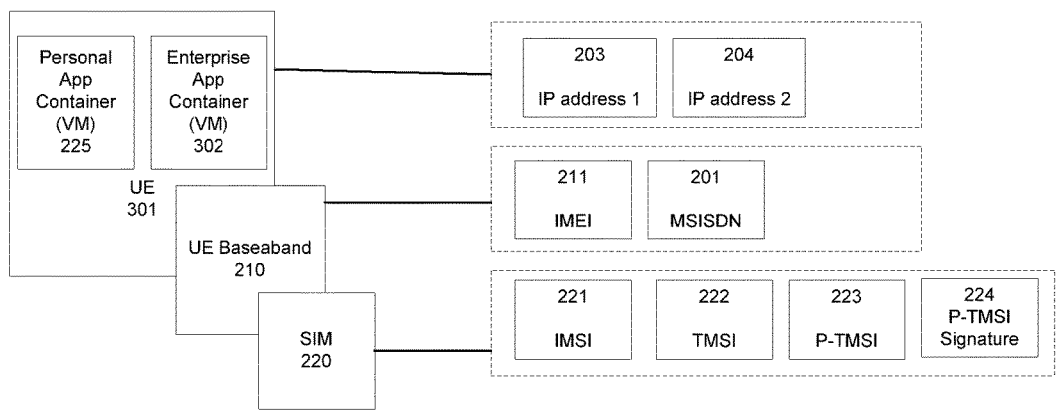
FIG. 2 is a block diagram illustrating functional entities of UE and associated identities used in such a system.
Figure 3A:
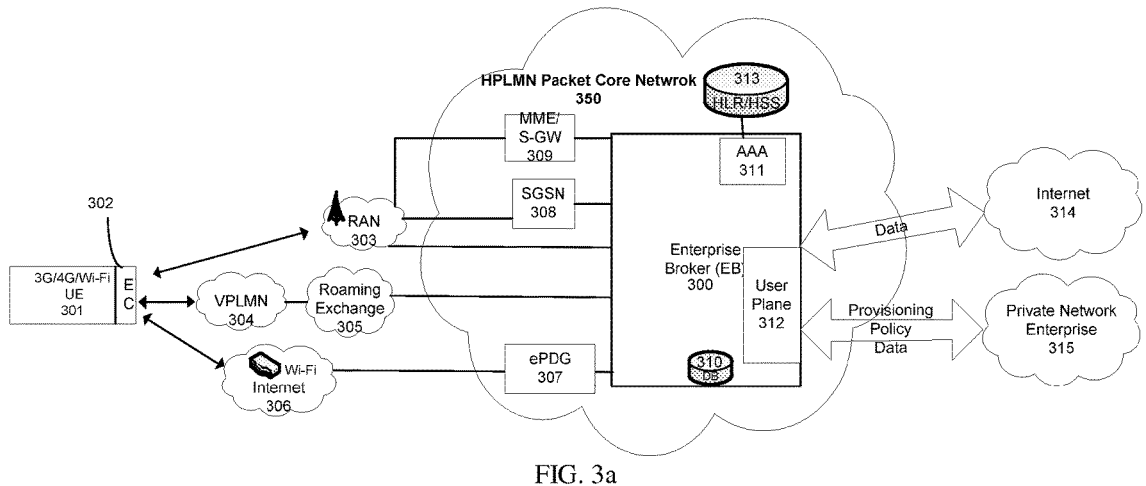
FIG. 3a is a block diagram illustrating the EC and EB entities in the context of a mobile network according to one embodiment of this disclosure.
Figure 3B:
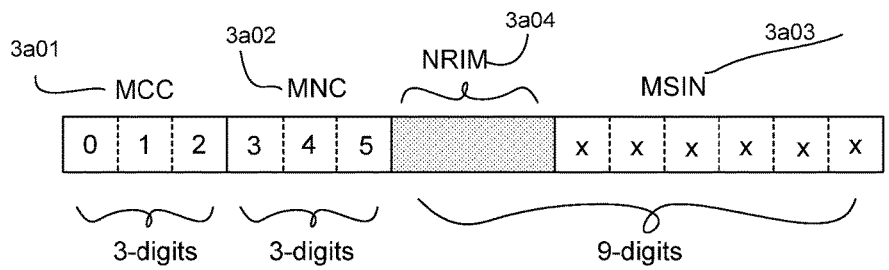
FIG. 3b is illustration of the structure of an International Mobile Subscriber Identity (IMSI).

FIG. 3b shows the structure of such an identification code-IMSI 3a00 (which is also referenced as 221 in the description with respect to FIG. 2). In the standard MOCN mechanism, the Mobile Network Code (MNC) 3a02 part of IMSI 3a00 is used to select the core network node for service. RAN 303 of FIG. 3a is configured with a map or a table in order to associate an MNC to a core network node and it selects the correct node accordingly. Therefore according to this embodiment, EB 300 is associated with a unique MNC if the standard MOCN mechanism is used. As per the enhancements described in U.S. patent application Ser. No. 12/987,546, the one, two or three highest digits of the Mobile Subscriber Identification Number (MSIN) 3a03 are used to select the core network node (EB 300) for service. In FIG. 3b these digits are termed Network Resource Identifying part of MSIN (NRIM) 3a04. RAN 303 of FIG. 3a may be configured with a map or a table in order to associate a NRIM to core network node mapping and it selects the correct node (EB 300) accordingly. Therefore according to this embodiment, EB 300 is associated with a unique value for the NRIM 3a04. The IMSI 3a00 is also in a SS7 signaling network to derive a global title that allows routing of a signaling message to the correct node. In the globally connected network, the MCC 3a01 and MNC 3a02 part of the IMSI 3a00 help locate the home operator's HLR/HSS 313 for roaming users. For many large operators, there could be many HLR/HSS's. In order to reach a specific HLR/HSS within the operator's network, the higher digits of the MSIN 3a04 may be use (i.e., the NRIM is used as a common practice).

IMSI 3a00 is the private identity of a subscriber and in 3GPP networks its use in signaling with the UE 301 is only recommended when the UE does not have a temporary identity such as Temporary Mobile Subscriber Identity (TMSI), P-TMSI, Global Unique Temporary UE Identity (GUTI), etc. While this embodiment as described utilizes a P-TMSI, it should be evident to those skilled in the art that the embodiment can be practiced with other temporary identities as well.

Figure 3C:
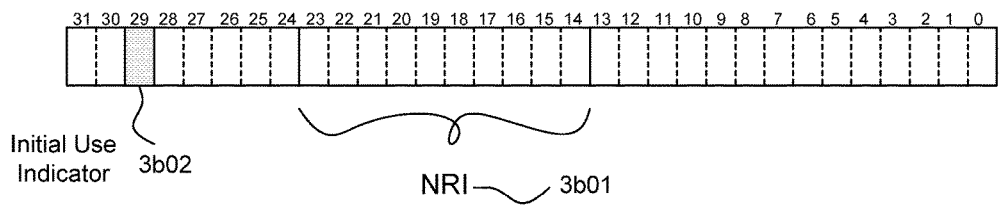
FIG. 3c is illustration of the structure of a Packet Temporary Mobile Subscriber Identity (P-TMSI).

Upon initial signaling using IMSI, the packet core network 110 assigns a temporary identity P-TMSI to the UE 301. (P-TMSI is referenced as 3b00 in the description with respect to FIGS. 3c and 223 in the description with respect to FIG. 2). The UE 301 is supposed to use the P-TMSI in all subsequent signaling as long as the core network node (EB 300) accepts it. The packet core network 110 may have a policy of refreshing the P-TMSI after a certain duration or upon failure to understand it. While generating the P-TMSI, the core network node (EB 300) also embeds its own identity in it in the form of Network Resource Identifier (NRI) 3b01. The structure of P-TMSI 3b00 is shown in FIG. 3c. Bit 29 is designated on the P-TMSI 3b00 as Initial Use Indicator 3b02. As the per the Iu-flex/S1-flex feature of the 3GPP specification, RAN 303 of FIG. 3a looks at the NRI 3b01 and routes the signaling to the corresponding core network node.

One aspect of this disclosure is the method which allows EC 302 to steer signaling to the preferred core network node EB 300. FIG. 2 shows a block diagram of UE 301 having Personal App Container (VM) 225 and EC 302, a self contained VM, according to this embodiment. UE baseband 210 in UE 301 is the module responsible for radio communication with the mobile network. The Subscriber Identity Module (SIM) 220 (also in UE 301) is a physical device with its own processor and storage. The SIM 220 is mainly used for authentication and as the storage for provisioned parameters, network parameters, etc. during the course of UE's 301 interaction with the network (e.g., IMSI 221 and P-TMSI 223 are stored in the SIM 220 files along with TMSI 222 and P-TMSI Signature 224). UE 301 or an authorized application on UE 301 can communicate with SIM 220 and read and modify parameters for these files. As per this disclosure, EC 302 is provided with the NRI 3b01 of EB 300 through pre-programming or by using any data transfer mechanism. When EC 302 on UE 301 is invoked, EC 302 checks the public land mobile network (PLMN) information either by querying the baseband 210 or by reading it from SIM 220. If UE 301 is in its home PLMN (home operator's network) it proceeds to read and save P-TMSI 223 and IMSI 221 from the SIM 220. Then it over-writes the Initial Use Indicator and NRI fields in the P-TMSI 223 with a preprogrammed value for the initial use and for the EB 300 respectively. Any subsequent signaling from UE 301 will now be steered by RAN 303 to EB 300.

According to this disclosure, in FIG. 3a, upon receiving a service request with P-TMSI Initial Use Indicator field set to "Initial Use" from EC 302, EB 300 will ignore the P-TMSI Signature 224 and initiate the procedure to obtain IMSI 221 from UE 301. Upon receiving IMSI 221, the EB 300 will be able to locate the associated employee record in database 310. It will then invoke the AAA 311 function to query the HLR/HSS 313 of the subscriber in order to obtain the mobile subscriber record and authentication vectors (e.g., response, other key materials, etc.). At this point, the EB 300 will perform full authentication with UE 301. Since UE 301 has the SIM 220 associated with the mobile subscriber, the authentication should go through. At this point EB 300 can assign a new P-TMSI 223 with predetermined rules to route subsequent signaling. The Initial Use Indicator field will be set to "Active". All other bits except the NRI bits could be set to identify the enterprise and the employee user. EB 300 can now proceed to fulfill the requested service as per the employee record and subscriber record obtained from HLR/HSS.

As an example, if the requested service from EC 302 was to establish a packet data protocol (PDP) context, the EB 300 will fulfill that and instruct the RAN 303 to send the user traffic to EB 300. EB 300 in consultation with the enterprise policy will set the traffic path to the enterprise 315 or to the Internet 314. Since EC 302 contains only enterprise authorized applications, each application can setup its own Internet Protocol (IP) flow toward the servers. Alternatively, all such applications can share a single HyperText Markup Language 5 (HTML5) connection between EC 302 and EB 300 and then EB 300 can proxy each flow to external entities. Once the EC 302 and EB 300 communication path is established, EC 302 can allow the download of enterprise approved applications. Thus without the loss of generality this process provides for comprehensive communication capability for the EC 302.

Another aspect of this disclosure is the establishment of a communication between EC 302 and EB 300 when UE 301 is under a RAN that cannot directly reach EB 300. In such a scenario, as also shown in FIG. 3a, RAN 303 connects to SGSN 308 and EC 302 will need to find a path to the EB 300. SGSN 308 uses subscriber's IMSI 221 to reach the associated HLR. When EC 302 accesses RAN 303 with a pre-programmed NRI value in the P-TMSI 223, RAN 303 will either fail to route the signaling or will route to an SGSN that will not recognize the P-TMSI and/or P-TMSI signature. Upon recognizing failure of the service request based on a modified P-TMSI, EC 302 will modify the MNC 3a02 field or NRIM 3a04 field depending on the home operator policy. Subsequently, when the SGSN requests the IMSI 221 from UE 302, UE 302 will respond with the modified IMSI. The MNC or NRIM field in the modified IMSI will point SGSN to the EB 300 as the HSS/HLR. When the signaling messages from SGSN reach EB 300, it will then restore the IMSI based on pre-provisioned information. EB 300 will then query the real HSS/HLR for that subscriber based on the restored IMSI using the built in AAA function 311. At this point, EB 300 will receive mobile subscription data. Based on employee record and mobile subscriber data received from HLR 313, EB 300 will insert enterprise APN in the subscriber record and deliver it to the SGSN so that it can respond to the service request. The enterprise APN will resolve to the EB 300 as the GGSN and the user traffic will come to it. From here onwards it works in the same way as described in previous described processes of this disclosure.

Another aspect of this disclosure is the establishment of communication between EC 302 and EB 300 when UE 301 is roaming in a foreign mobile network (i.e., Visited PLMN (VPLMN)) 304 as shown in FIG. 3a when EC 302 is invoked. When EC 302 identifies that is in a foreign VPLMN 304, according to this disclosure, EC 302 will modify the IMSI just as described previously. The SGSN in the visited network will go through the roaming exchange 305 to reach the EB 300 as the HSS/HLR. The rest of the procedures are the same.

When EC 302 is shutdown, or when a user switches to another VM on the UE 301, according to this disclosure EC 302 will restore the original P-TMSI 223 and the IMSI 221 that it had read during the startup time.

When the employment arrangement with the enterprise ends, the enterprise can instruct the EC 302 to wipe or disable itself. The enterprise may also tell EB 300 to remove service for such employee. Without a functional EC 302, UE 301 will be in equivalent condition prior to being provisioned in EB 300.

Figure 4:
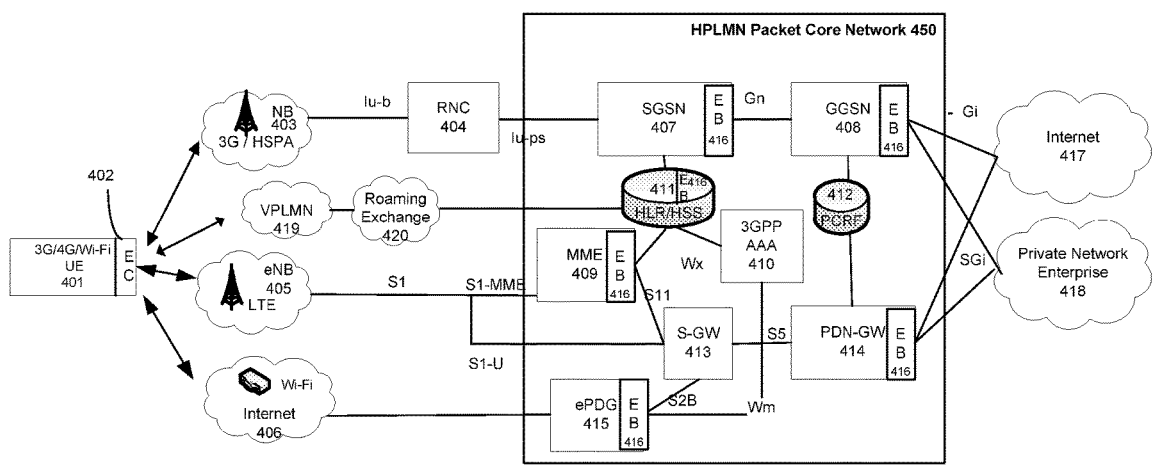
FIG. 4 is a block diagram illustrating EC and EB entities in the context of a mobile network according to another embodiment.

FIG. 4 shows another embodiment of this disclosure whereby the EB 416 functionality is realized partially or completely in existing packet core nodes. For example, EB 416 can be implemented fully in SGSN 407 or partly in HLR/HSS 411 and partly in GGSN 408. Similarly, for 4G based access, EB 416 can be realized in MME 409 and P-GW 414 or in HLR/HSS 411 and P-GW 414. Finally for Wi-Fi based access, EB 416 can be realized in the ePDG 415. For access from visited foreign network VPLMN 419, EB 416 inside the SGSN 407, MME 409 or HLR/HSS 411 can be reached via roaming exchange 420. To the skilled in art it should be clear that realization will be able to provide equivalent functionality as in the previous embodiment.

Figure 5:
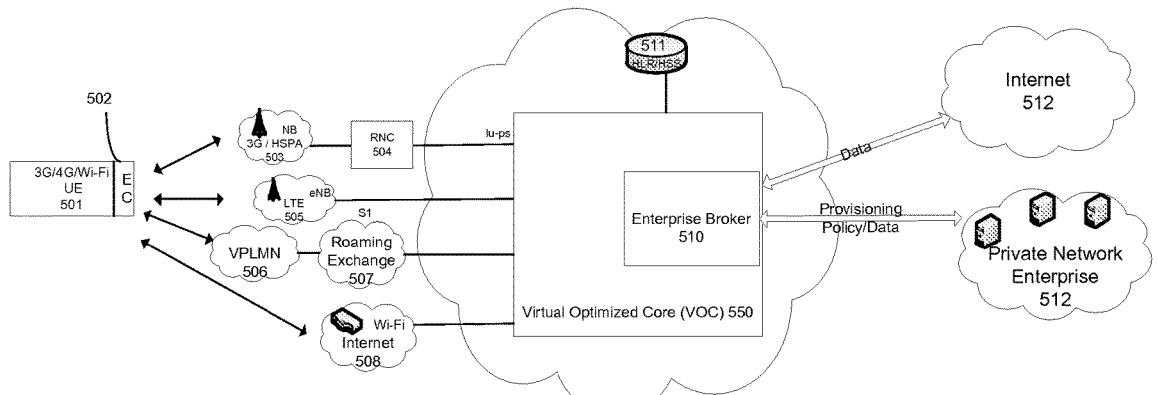
FIG. 5 is a block diagram illustrating EC and EB entities in the context of a mobile network according to yet another embodiment.

FIG. 5 shows another embodiment of this disclosure whereby EB 510 functionality is realized as an extension of a collapsed and virtualized packet core 550. A Virtualized Optimized Core (VOC) is a flexible and scalable realization of essential functions of a mobile packet core in a service oriented (SOA) way. A 3G/4G/Wi-Fi access network can be served by the VOC instead of the traditional mobile packet core. The private networking capabilities of the VOC are described in U.S. patent application Ser. No. 13/763,653, filed Feb. 9, 2013, and titled "Method and System for Automatic Provisioning of Enterprise Private Network Over 3G/4G Mobile Wireless Networks While Maintaining Respectively Consistent Identities", which is hereby incorporated by reference in its entirety. In FIG. 5, VOC 550 interfaces with local RAN 503, RAN 505, and Wi-Fi 508. It also interfaces with Visited Network VPLMN 506 through roaming exchange 507. To the skilled in art it should be clear that realization will be able to provide equivalent functionality as the previous embodiments.

Some portions of the preceding detailed descriptions have been presented in terms of processes and symbolic representations of operations on data bits within a computer memory. These descriptions and representations are the ways used by those skilled in the data processing arts to most effectively convey the substance of their work to others skilled in the art. A process is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present disclosure also relate to an apparatus for performing the operations herein. This apparatus may be specially constructed for the required purposes, or it may comprise a general-purpose computer having a communication (or network) interface, a processor and memory and selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The processes and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments disclosed herein are not described with reference to any particular programming language. It will be appreciated that a variety of programming languages may be used to implement the teachings of embodiments as described herein.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Moreover, the illustration of a process by its depiction in a drawing does not imply that the illustrated process is exclusive of other variations and modifications thereto, does not imply that the illustrated process or any of its steps are necessary to the embodiment(s), and does not imply that the illustrated process is preferred.

In this disclosure, devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

In the foregoing specification, embodiments of this disclosure have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A network element for processing network traffic of a packet network comprising:
   an access network interface unit configured to send and receive communications from a mobile device and an enterprise network; and
   a processor with a memory associated with the network interface unit and adapted to:
      receive a first subscriber identification code and a request for service from a mobile device;
      match the first subscriber identification code to an employee record from the memory;
      query a remote database to obtain a mobile subscriber record and authentication vectors associated with the employee record;
      perform authentication of the mobile device; and
      fulfill the request for service from the mobile device.

2. The network element of claim 1, wherein the processor is further adapted to:
   assign a second subscriber identification code to the mobile device which is encoded with predetermined rules to route the subsequent signaling.

3. The network element of claim 1, wherein the processor is further adapted to:
   receive provisioning data from the enterprise network, modify the first subscriber identification code according to a predetermined rules to route the subsequent signaling to the corresponding enterprise network, store the provisioning data and modified first subscriber identification code in the memory associated with each enterprise employee's device, and send the modified first subscriber identification code to each enterprise employee's device.

4. The network element of claim 3, wherein the provisioning data includes enterprise network policies associated with each employee, employee subscription and employee mobile devices.

5. The network element of claim 1, wherein the first subscriber identification code is an International mobile subscriber identity (IMSI).

6. The network element of claim 2, wherein the second subscriber identification code is a packet temporary mobile subscriber identity (P-TMSI) or global user temporary identity (GUTI).

7. The network element of claim 1, wherein the processor is further adapted to:
receive a modified first identification code from the mobile device through a SGSN at 3GPP based core network in a case where a RAN does not have a direct communication link to the network element to transfer a signal from the mobile device.

8. The network element of claim 1, wherein the processor is further adapted to:
receive a modified first identification code from the mobile device through a foreign SGSN and a roaming exchange in a case where the mobile device is in a foreign mobile network.

9. The network element of claim 1, wherein the processor is further adapted to:
receive instructions regarding ending a relationship with an employee from the enterprise network; and
sending instructions to the mobile device to restore the first subscriber identification code for subsequent signaling.

10. The network element of claim 1, wherein the remote database is an HLR/HSS database.

11. A system comprising:
a mobile device comprising:
an access network interface configured to send and receive communications from a packet network; and
a processor with a memory associated with the network interface unit and adapted to:
operate an isolated container for enterprise authorized applications;
a network element for processing network traffic of a packet network and in communication with the mobile device, said network element comprising:
an access network interface unit configured to send and receive communications from a mobile device and an enterprise network; and
a processor with a memory associated with the network interface unit and adapted to:
receive a first subscriber identification code and a request for service from the mobile device;
match the first subscriber identification code to an employee record from the memory;
query a remote database to obtain a mobile subscriber record and authentication vectors associated with the employee record;
perform authentication of the mobile device; and
fulfill the request for service from the mobile device.

12. The system of claim 11, wherein the processor is further adapted to:
assign a second subscriber identification code to the mobile device which is encoded with predetermined rules to route the subsequent signaling.

13. The system of claim 11, wherein the processor is further adapted to:
receive provisioning data from the enterprise network, modify the first subscriber identification code according to a predetermined rules to route the subsequent signaling to the corresponding enterprise network, store the provisioning data and modified first subscriber identification code in the memory associated with each enterprise employee's device, and send the modified first subscriber identification code to each enterprise employee's device.

14. The system of claim 13, wherein the provisioning data includes enterprise network policies associated with each employee, employee subscription and employee mobile devices.

15. The system of claim 11 wherein the first subscriber identification code is an International mobile subscriber identity (IMSI).

16. The system of claim 12, wherein the second subscriber identification code is a packet temporary mobile subscriber identity (P-TMSI) or global user temporary identity (GUTI).

17. The system of claim 11, wherein the processor is further adapted to:
receive a modified first identification code from the mobile device through a SGSN at 3GPP based core network in a case where a RAN does not have a direct communication link to the network element to transfer a signal from the mobile device.

18. The system of claim 11, wherein the processor is further adapted to:
receive a modified first identification code from the mobile device through a foreign SGSN and a roaming exchange in a case where the mobile device is in a foreign mobile network.

19. A system of claim 11, wherein the mobile device is further comprising:
an access network interface unit configured to send and receive communications from a packet network; and
a processor with a memory associated with the access network interface unit and adapted to:
modify the Network Resource Indication (NRI) bits of a Packet Temporary Mobile Subscriber Identity (P-TMSI) to a value corresponding to an enterprise broker located in a mobile packet core; and
send and receive communications to and from the enterprise broker.

20. The system of claim 19, wherein the processor is further adapted to:
recognize a failure of a query to reach an HSS/HLR database;
transmit the query to an enterprise broker instead of the HSS/HLR database; and
receive the response to the query from the enterprise broker.

21. A method performed with a network element having an access network unit interface, a processor and memory, said network element configured to process network signaling of a packet core network, the method comprising:
receiving a first subscriber identification code and a request for service from a mobile device;
matching the first subscriber identification code to an employee record from the memory;
querying a remote database to obtain a mobile subscriber record and authentication vectors associated with the employee record;
performing an authentication of the mobile device; and
fulfilling the request for service from the mobile device.

22. The method of claim 21, wherein the processor is further adapted to:
receive provisioning data from the enterprise network, modify the first subscriber identification code according to a predetermined rules to route the subsequent signaling to the corresponding enterprise network, store the provisioning data and modified first subscriber identification code in the memory associated with each enterprise employee's device, and send the modified first subscriber identification code to each enterprise employee's device.

* * * * *